United States Patent Office 3,252,082
Patented May 17, 1966

3,252,082
METHOD AND COMPOSITION FOR AIDING NUCLEAR MAGNETIC WELL LOGGING
Karl H. Hiller, Laguna Beach, Calif., assignor to Chevron Research Company, a corporation of Delaware
No Drawing. Filed Jan. 2, 1964, Ser. No. 335,406
5 Claims. (Cl. 324—.5)

The present invention relates to nuclear magnetism well logging and more particularly to a method for improving diagnostic ability of a nuclear magnetism well log. The invention has particular application in shortening the nuclear magnetism relaxation time of protons of one class of fluids, such as water, relative to those of another class of fluids, such as hydrocarbons, in an earth formation penetrated by a well bore.

The object of the invention is to provide an improved method of distinguishing the protons of hydrocarbons within an earth formation traversed by a well bore from the protons of water within the formation by the introduction of paramagnetic metal ions to a water-base drilling fluid or an oil-and-water emulsion drilling fluid to form an improved drilling fluid whose filtrate will contain the paramagnetic ions. The paramagnetic ions, being soluble in water, become associated with the formation waters and cause a change in the measurable nuclear magnetic relaxation signals from protons in those waters. In that manner the use of the drilling fluid additive of the present invention assists the nuclear magnetism log in distinguishing formation water from formation hydrocarbons even when the physical environment of temperature, pressure and paramagnetic impurities would normally cause the protons within both of these fluids to have substantially the same relaxation times.

In nuclear magnetism well logging where the relaxation times of protons within fluids in and around a well bore are measured to provide for direct indications of the presence of oil, the protons of the fluids are first aligned by a strong polarizing field and then released to relax into a form of alignment with a second field. In the process of relaxing, the protons act as small gyroscopes and precess about the direction of the second field. The precession of the protons establishes a rotating magnetic field and the measurement of that field, as with a coil cut by the flux lines of the field to have a signal induced therein, is a measure of the nuclear magnetic precession signal. Relaxation is measured in time and is determined from the induced signal damped by the processes of relaxation.

In nuclear magnetism well logging as performed in accordance with the present invention, a coil is positioned within a well bore adjacent to the formation that is to be logged for the presence of protons. The coil may serve both as a polarizing coil and as a signal receiving coil, being first energized to establish the polarizing field and then being connected to a signal recording device to display a signal current induced by the precessing protons. In establishing the polarizing field, a direct current is passed through the coil for a predetermined time interval causing the nuclear magnetic moments of the protons to be oriented in the direction of the magnetic field established by the coil. When the magnetic field is interrupted, protons in the nuclei of fluids surrounding the well bore and within the well bore will precess about a suitable second field usually the earth's relatively weak magnetic field. The time required for the protons to cease. measurable precession or to become randomized in their orientations after termination of the polarizing field is referred to as the relaxation time and is indicated by measuring an induced signal voltage at the coil proportional to the strength of the rotating magnetic field caused by the precessing protons. The amplitude of the induced signal voltage is plotted as a function of time to illustrate the process of relaxation.

Under ideal conditions, the relaxation time of protons of water is much longer than the relaxation time of protons of oil. If both water and oil are present within the polarization field and their protons are caused to precess about the earth's magnetic field in a process of relaxation, the intensity of the detected nuclear magnetic signal voltage will depend, initially, on the protons of both the oil and the water and then, as time increases, will depend only on the protons of the water. Thus an analysis of the waveform envelope of the induced signal produced by the precessing polarized protons will indicate the presence of oil alone or oil intermixed with water within the formation.

However, under down-hole conditions of many wells where the pressure and temperatures are both quite high and where crude oil may contain very large amounts of dissolved impurities and hydrocarbon fractions, experience has shown that the relaxation times for protons of water and hydrocarbons are substantially equal. Thus the relaxation times of these fluids can be distinguished from one another only with great difficulty.

In a patent assigned to the assignee of the present application (Nuclear Magnetic Logging Method, A. E. Worthington, issued June 8, 1965, now Patent No. 3,188,- 556), there is disclosed a method of reducing the relaxation times of protons of water within an earth formation relative to the relaxation times of protons of crude oil within such formation to aid in determining the presence of such oil. In the method, a molecular paramagnetic material such as molecular oxygen is added to the drilling fluid circulating through the well bore. The molecular oxygen, being soluble in water, penetrates the filter cake formed at the side wall of the well bore, and diffuses throughout the formation water to reduce the nuclear magnetism relaxation times of the protons of such water. Not all the molecular oxygen passes into the earth formation, however. The portion of the oxygen not passing into the earth formation is an oxidizing agent and creates an extremely corrosive environment in the well bore. Such an environment is undesirable when the well bore is later cased with metallic pipe. Attempts have been made to remedy the corrosion problems caused by oxygen remaining in the well bore. Another method of reducing the relaxation times of water protons attempts to utilize soluble ionized paramagnetic metal salts in drilling fluids in a manner similar to the molecular oxygen. However, it has been found that such metal salts have a tendency to be incompatible with weakly-basic drilling fluids forming insoluble hydroxide compounds that increase the viscosity of the treated fluid and the volume of filtrate passing into the formation. Since most drilling fluids commercially available are weakly-basic, it would be desirable to be able to admix ionized paramagnetic metal salts with weakly-basic drilling fluids without disturbing rheological and filtration properties of such treated fluids. (In this application, the term "weakly-basic drilling fluid" signifies a fluid having an upper pH limit of 12.4 and a preferred range of from about 8–12.)

Briefly, in accordance with the invention, a paramagnetic manganese chelate compound is introduced into a weakly-basic drilling fluid, whether the drilling fluid be water-base or oil-in-water emulsion, and exhibits unexpected advantages in shortening the relaxation time of the formation water without appreciably affecting the rheological (flow) properties of the drilling fluid.

The paramagnetic manganese chelate compounds preferred in carrying out the invention are water-soluble contains no more than 20 carbon atoms. Thus aminocarboxylic acids and salts of these acids are preferred chelating agents in the invention. Examples of aminocarboxylic acids useful in carrying out the invention include those acids that form stable heterocyclic rings with the paramagnetic manganese metal ion. Since the rings are particularly stable with a number of constituent atoms as in the range from 5 to 8, hence, alpha-, beta-, gamma-, and delta-aminocarboxylic acids are preferred. Representative aminocarboxylic acids coming within this classification are:

(1) The polyaminocarboxylic acids and their metal salts having the general formula

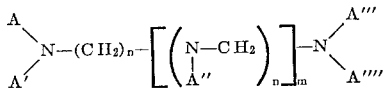

where $n$ and $n'$ represent an integer of 2 or 3, $m$ represents zero or an integer, and A, A', A'', A''', and A'''' are radicals selected from the group consisting of —$CH_2COOH$
—$CH_2CH_2OH$, and
—$CH_2COOM$ where M is one equivalent of an alkali metal or ammonium, and (2) The monoaminocarboxylic acids and their salts having the general formula

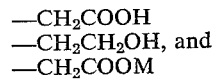

where A, A', A'' represent the radicals of the group listed above. In order that the compound have the properties of an acid, or an acid salt, it is axiomatic that at least A, A' or A'' be an acid, or acid-salt radical. Illustrative examples of the polyaminocarboxyl type chelating agents are ethylenediaminetetraacetic acid, diethylenetriaminepentaacetic acid, hydroxyethylethylenediaminetriacetic acid, dihydroxyethylethylenediaminediacetic acid, and also the metal salts of the above agents, such as salts of the alkali metals as lithium, sodium, potassium, and ammonium.

Illustrative examples of the monoaminocarboxyl type compounds are dihydroxyethylglycine, hydroxyethyliminodiacetic acid, nitrilotriacetic acid, and the metal salts of the above acids of the alkali metals and ammonium as listed above.

The polyaminocarboxylic acid type chelating agents are generally most effective. The alkali metal salts of these acids are usually used with the sodium salts being preferred.

Minimum amounts of paramagnetic manganese chelate compound to be added to the drilling fluid will depend on the rate of filtration loss of the drilling fluid in order to stablize invasion over the entire length of the well bore. Since the rate of filtration loss is

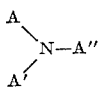

where $Qw$ is fluid loss, $t$ is time, P is pressure and $u$ is viscosity, $Qs$ is the volume of solids in the filter cake and K is a constant, such amounts will depend upon the operative conditions and physical properties of the treated drilling fluids.

In this regard, it has been found—for a manganese aminocarboxylic acid chelate compound—that, in terms of pounds per 42-gallon barrel of the untreated drilling fluid (p.p.b.), 0.5 to 2 p.p.b. of such chelate compound is preferred in carrying out the invention and 0.1 to 5 p.p.b. of such chelate compound can be used to form an improved drilling fluid whose filtrate contains the dissolved manganese in sufficient amounts to reduce the relaxation time of formation water exterior of a well bore without adversely affecting the rheological properties of the treated drilling fluid.

The molecular ratio of the aminocarboxylic acid to dissolve manganese in the above-listed example is at least 1.45:1 and is preferably in the range between 1.5:1 to 2:1 to assure the stablization of the manganese amino chelate compound in the presence of calcium hydroxide, a common drilling fluid constituent. The upper limit of the molecular ratio of these materials is not critical to carry out the invention but it has been found that a molecular ratio above 5:1 is economically undesirable since excess unreacted amino acid remains in the drilling fluid.

Without departing from the intended scope of the invention, aminocarboxylic acid chelate compounds of other paramagnetic metals—i.e., vanadium (III), chromium (III), cobalt (II), and nickel (II)—may also be combined in the above-listed proportions with weakly-basic drilling fluids to form improved drilling fluid having characteristics for improving the diagnostic ability of a nuclear magnetism well log.

In a method of carrying out the invention as explained by illustrative reference to the above-listed example, a manganese aminocarboxylic acid chelate compound is established in a water-base or oil-and-water emulsion drilling fluid to shorten the relaxation time of formation water surrounding the well bore by (1) dispersing or dissolving a manganese salt and an aminocarboxylic acid in a suitable solvent, preferably water and then (2) admixing the formed dispersion or solution with drilling fluid circulating through the well bore.

The dispersion of the manganese chelate in the drilling fluid may be achieved by known mixing procedures performed at the well site without substantially risking undesired changes in the rheological properties of the drilling fluids. For example, if the dispersion is to be formed at the well site, a tank interconnected with the drilling fluid circulatory system serves conveniently as a mix container to receive an aqueous solution of manganese salt and aminocarboxylic acid. To speed solution, the mix container may also be provided with mechanical stirrers connected to a source of electrical power.

Admixing the formed manganese chelate dispersion or solution with the untreated drilling fluid, preferably but not necessarily, is achieved by means of a T coupling section connected to the mud pumps, the mix tank, and the drilling fluid reservoir, respectively. In operation, drilling fluid enters through a first port of the T section, admixes with the chelate compound entering through a second port, and exits (along with the chelate compound) through a third port connected to the well bore. The volume of chelate solution to be absorbed by the drilling fluid varies in accordance with the above-listed ranges of constituency. Hence, adjustment (by valves at the T section) of the flow rates of the manganese chelate solution and the untreated drilling fluid may be necessary to assure adequate amounts of manganese chelate compound in the treated drilling fluid.

As the treated fluid circulates through the well bore, the drilling fluid pressure is maintained above that of the formation exterior of the well bore. The higher fluid pressure, as is well-known, assures the formation of an adequate filter cake and migration of the filtrate containing the chelate compound into the formation.

In a modification of the invention the manganese polyaminocarboxylic acid chelate compound is formed in situ by adding manganese and polyaminocarboxylic acid compounds separately to the drilling fluid as the fluid circulates through the well bore in amounts sufficient to form above-listed preferred volumes of chelate compounds in the fluid. Preferably, the constituents are slowly added in small amounts to the circulating fluid to speed the formation of preferred concentrations.

The following examples illustrate the preparation of the invention as an additive to drilling fluids. It will be apparent to those skilled in the art that in these examples drilling fluid constituency can be varied as by adding different clays and weighting materials without departing from the scope of the invention.

Example I

A manganese chelate compound of ethylenediaminetetraacetic acid (EDTA) is prepared in accordance with the present invention by the procedure of mixing 1.45 molecular parts of ethylenediaminetetraacetic acid or its sodium salt, slurried in water, with one molecular part of manganese sulfate ($MnSO_4 \cdot H_2O$), adding water to dissolve the materials and adjusting the pH level of the solution to a value between 9 and 10 by the addition of sodium hydroxide. The manganese chelate compound concentration is adjusted so that the drilling fluid absorbing the chelate compound contains the manganese salt within the concentration limits previously mentioned.

Characteristics of several muds containing the addition of 1.1 p.p.b. of manganese metal EDTA chelate compound prepared in the above manner is shown in Table I. The samples were tested in accordance with API Bulletin RP13B (Standard Procedure for Testing Drilling Fluids, November 1962), Section 2 (paragraphs 2.7 to 2.11), and Section 6.

TABLE I

| Sample No. | Drilling Fluid | Before Treating | After Treating |
|---|---|---|---|
| 1 | Low pH Sodium-base Mud: | | |
| | Viscosity (cp.) | 26 | 17 |
| | Yield Point (lbs./100 ft.²) | 33 | 23 |
| | 10 min. gel strength (lb./100 ft.²) | 97 | 81 |
| | pH | 8.2 | 9.1 |
| | Temperature, °F | 70 | 70 |
| 2 | Gypsum-Q-Broxin Mud with Emulsified Oil: | | |
| | Viscosity (cp.) | 15 | 17 |
| | Yield Point (lbs./100 ft.²) | 13 | 9 |
| | 10 min. gel strength (lb./100 ft.²) | 18 | 14 |
| | pH | 8.5 | 8.7 |
| | Temperature, °F | 70 | 70 |
| 3 | Low pH Diesel Oil Emulsion Mud: | | |
| | Viscosity (cp.) | 17 | 16 |
| | Yield Point (lbs./100 ft.²) | 8 | 9 |
| | 10 min. gel strength (lb./100 ft.²) | 3 | 6 |
| | pH | 7.9 | 8.5 |
| | Temperature, °F | 70 | 70 |
| 4 | High pH, Lime-Lignite Emulsion Mud: | | |
| | Viscosity (cp.) | 17 | 15 |
| | Yield Point (lbs./100 ft.²) | 5 | 5 |
| | 10 min. gel strength (lb./100 ft.²) | 10 | 6 |
| | pH | 12.4 | 12.4 |
| | Temperature, °F | 70 | 70 |

The data of Table I indicate that the treatment of drilling fluids with manganese chelate compound made no significant change in the rheological properties of the fluids.

Example II

An iron chelate compound of ethylenediaminetetraacetic acid (EDTA) is prepared in accordance with the present invention by the procedure of mixing 1.50 molecular parts of ethylenediaminetetraacetic acid or its sodium salt, slurried in water, with one molecular part of ferric chloride ($FeCl_3 \cdot 6H_2O$), adding water to dissolve the materials, adjusting the pH level of the solution to a value between 9 and 10 by the addition of sodium hydroxide and heating the mixture to speed solution of the material. The iron chelate compound concentration is adjusted so that the drilling fluid absorbing the chelate compound contains the iron salt within the concentration limits previously mentioned.

Characteristics of several muds containing the addition of 1.1 p.p.b. of iron EDTA compound prepared in the above manner are shown in Table II. The samples were tested in accordance with API Bulletin RP13B (Standard Procedure for Testing Drilling Fluids, November 1962), Section 2 (paragraphs 2.7 to 2.11), and Section 6.

TABLE II

| Sample No. | Drilling Fluid | Before Treating | After Treating |
|---|---|---|---|
| 1 | Low pH Sodium-base Mud: | | |
| | Viscosity (cp.) | 26 | 18 |
| | Yield Point (lbs./100 ft.²) | 33 | 19 |
| | 10 min. gel strength (lb./100 ft.²) | 97 | 87 |
| | pH | 8.2 | 8.8 |
| | Temperature, °F | 70 | 70 |
| 2 | Gypsum-Q-Broxin Mud with Emulsified Oil: | | |
| | Viscosity (cp.) | 15 | 16 |
| | Yield Point (lbs./100 ft.²) | 13 | 11 |
| | 10 min. gel strength (lb./100 ft.²) | 18 | 10 |
| | pH | 8.5 | 8.3 |
| | Temperature, °F | 70 | 70 |
| 3 | Low pH Diesel Oil Emulsion Mud: | | |
| | Viscosity (cp.) | 17 | 14 |
| | Yield Point (lbs./100 ft.²) | 8 | 7 |
| | 10 min. gel strength (lb./100 ft.²) | 3 | 6 |
| | pH | 7.9 | 7.9 |
| | Temperature, °F | 70 | 70 |
| 4 | High pH, Lime-Lignite Emulsion Mud: | | |
| | Viscosity (cp.) | 17 | 18 |
| | Yield Point (lbs./100 ft.²) | 5 | 6 |
| | 10 min. gel strength (lb./100 ft.²) | 10 | 31 |
| | pH | 12.4 | 12.3 |
| | Temperature, °F | 70 | 70 |

The data of Table II indicate that the treatment of drilling fluids with iron amino chelate compound made no significant change in the rheological properties of the fluids.

To further illustrate the present invention, the filtrates of the drilling fluids of Tables I and II were tested to determine the effectiveness of the additives prepared in accordance with Examples 1 and 2 as relaxation time shorteners. The filtrates were obtained in accordance with Section 3 (paragraphs 3.1 to 3.11) of API Bulletin RP13B (Standard Procedure for Testing Drilling Fluids, November 1962).

The relaxation time of each filtrate was measured using a testing apparatus comprising a U-shaped base frame and a bed mounted on a shaft journaled at the sides of the frame and supporting (1) a container into which the filtrate was placed, (2) a D.C. polarizing coil and (3) an A.C. detection coil serially connected to an oscilloscope.

The test apparatus is described in detail in U.S. Patent No. 3,048,773 (Fluid Remnant Magnetization Tester, R. J. S. Brown, issued August 7, 1962) assigned to the assignee of this application.

In the procedure for measuring the relaxation time of a filtrate sample, the axis of symmetry of the container was first positioned in a nonparallel relationship with the earth's magnetic field by pivoting the bed and shaft relative to the base frame. The off-vertical magnetic field was next established in the container by energizing the D.C. polarizing coil located on the bed adjacent to the container by means of the power supply contained in the control box on the base frame. After sufficient polarization of the sample the polarizing field was terminated. The detector coil located on the bed adjacent to the container was then actuated. As the rotating nuclear magnetic field was established by the precessing protons, an alternating signal voltage, varying at the free precessional frequency of the protons, was induced in the coil and displayed on the oscilloscope. A camera was attached to the face of the oscilloscope to make a permanent record of the signal waveform. After the picture was developed the amplitude of the minimum threshold signal level (S) was plotted on the picture wherein that amplitude equals $$S_0 \frac{1}{e}$$

where $S_0$ is initial signal amplitude and $e$ is the natural logarithm base. The relaxation time of the sample was then determined by observing the time duration from the initial signal response ($S_0$) to the minimum threshold signal level (S). The results of these tests are given in Table III.

TABLE III

| Sample | Relaxation Time (msec.) of Filtrate collected after 30 min. | | | pH | | |
|---|---|---|---|---|---|---|
| | Before Treatment | After Treatment | | Before Treatment | After Treatment | |
| | | Complexed Manganese | Complexed Iron | | Complexed Manganese | Complexed Iron |
| 1 | 255 | 25 | 97 | 8.2 | 9.1 | 8.8 |
| 2 | 355 | 25 | 80 | 8.5 | 8.7 | 8.3 |
| 3 | 600 | 22 | 98 | 7.9 | 8.5 | 7.9 |
| 4 | 950 | 950 | 650 | 12.4 | 12.4 | 12.3 |

The data of Table III indicate that manganese EDTA chelate compounds formed in the above manner and added to drilling fluids are superior to iron chelate compounds in that the former have greater effect in lowering the relaxation time of the filtrates of these fluids. It is noted that an exception exists for improvement of the diagnostic ability of a nuclear well log where the drilling fluid is a high pH (12.4) lime-lignite emulsion mud (Sample 4). That sample shows little or no improvement in relaxation time inhibitors for either the manganese or iron chelate compound.

What is claimed is:

1. An improved process for reducing the nuclear magnetic relaxation time of water in an earth formation penetrated by a well bore which comprises the step of circulating a weakly-basic aqueous suspension of clay through the well bore, adding to each barrel of said suspension 0.5 to 2 lbs. of a paramagnetic manganese aminocarboxylic acid chelate compound dissolved in sufficient water to form a solution, said solution having an excess of aminocarboxylic acid relative to manganese in stoichiometric proportions of at least 1.45:1, to provide a filtrate containing a sufficient amount of said manganese aminocarboxylic acid chelate compound to reduce said relaxation time of said water in said formation, while maintaining satisfactory rheological properties of said suspension.

2. An improved process for reducing the relaxation time of water in an earth formation penetrated by a well bore which comprises the step of circulating a weakly-basic aqueous suspension of clayey materials through the well bore, and adding to each barrel of said suspension 0.1 to 5 lbs. of a paramagnetic manganese aminocarboxylic acid compound dissolved in sufficient water to form a solution, said solution having an excess of aminocarboxylic acid relative to manganese in stoichiometric proportions of at least 1.45:1, to provide a filtrate containing a sufficient amount of said manganese aminocarboxylic acid chelate compound to reduce said relaxation time of said water in said formation, while maintaining satisfactory rheological properties of said suspension.

3. An improved drilling fluid for reducing the nuclear magnetic relaxation time of water in an earth formation penetrated by a well bore comprising a weakly-basic aqueous suspension of clayey materials and a stable paramagnetic manganese aminocarboxylic acid chelate compound in an amount sufficient to reduce said relaxation time of formation water exterior to the well bore while maintaining satisfactory rheological properties of said suspension, said manganese aminocarboxylic acid chelate compound comprising manganese and aminocarboxylic acid in molecular ratios in the range of 1:1.5 to 1:2.

4. The improved drilling fluid of claim 3 wherein the manganese aminocarboxylic chelate compound is present in amounts from about 0.5 to 2 lbs. per 42 gallon-barrel of said drilling fluid.

5. The improved drilling fluid of claim 3 wherein the manganese aminocarboxylic chelate compound is present in amounts from about 0.1 to 5 lbs. per 42 gallon-barrel of said drilling fluid.

References Cited by the Examiner

FOREIGN PATENTS 235,169 . 8/1961 Australia.
568,235 11/1959 Canada.

OTHER REFERENCES

Yoshino et al., Canadian Journal of Chemistry, vol. 40, No. 4, April 1962, pages 775–783 incl.

CHESTER L. JUSTUS, *Primary Examiner.*

MAYNARD R. WILBUR, *Examiners.*